United States Patent
Miao et al.

(10) Patent No.: US 11,617,173 B2
(45) Date of Patent: Mar. 28, 2023

(54) METHOD, DEVICE, APPARATUS, AND STORAGE MEDIUM FOR INDICATING AND RECEIVING RESOURCE LOCATION

(71) Applicant: ZTE CORPORATION, Guangdong (CN)

(72) Inventors: Ting Miao, Shenzhen (CN); Feng Bi, Shenzhen (CN); Peng Hao, Shenzhen (CN); Xing Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 99 days.

(21) Appl. No.: 16/785,072

(22) Filed: Feb. 7, 2020

(65) Prior Publication Data

US 2020/0314845 A1    Oct. 1, 2020

Related U.S. Application Data

(63) Continuation of application No. PCT/CN2018/098377, filed on Aug. 2, 2018.

(30) Foreign Application Priority Data

Aug. 11, 2017  (CN) .......................... 201710687231.8

(51) Int. Cl.
*H04W 72/0453* (2023.01)
*H04W 72/20* (2023.01)

(52) U.S. Cl.
CPC ....... *H04W 72/0453* (2013.01); *H04W 72/20* (2023.01)

(58) Field of Classification Search
CPC ......... H04W 72/0453; H04W 72/0406; H04W 72/20
See application file for complete search history.

(56) References Cited

U.S. PATENT DOCUMENTS

2017/0238292 A1\* 8/2017 Rico Alvarino ...... H04W 48/00
370/329
2018/0063841 A1\* 3/2018 Song ................... H04W 72/042
(Continued)

FOREIGN PATENT DOCUMENTS

| CN | 102325119 A | 1/2012 |
| CN | 103716841 A | 4/2014 |

(Continued)

OTHER PUBLICATIONS

Ericsson: "Channel raster for NB-IOT" 3GPP TSG-RAN4 Meeting #77 NB-IOT AH; R4-77AH-IOT-0048; Jan. 22, 2016; Budapest, Hungary (3 pages).

(Continued)

*Primary Examiner* — Jasper Kwoh
(74) *Attorney, Agent, or Firm* — Foley & Lardner LLP

(57) ABSTRACT

Provided is a method Methods and devices for indicating a resource location include a first-type node sending resource location information to a second-type node. The resource location information at least indicates a frequency-domain location of a second resource according to a frequency domain offset from the second resource to a boundary location of a first resource in a frequency domain, and a bandwidth of the second resource. The first resource can include a synchronization signal (SS) block and the second resource can include a common control resource set. A frequency-domain location of the first resource can be indicated by the boundary location of the first resource in a frequency domain and a bandwidth of the first resource.

16 Claims, 6 Drawing Sheets

A first-type node sends resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET ⟶ S202

(56) References Cited

U.S. PATENT DOCUMENTS

| | | | | |
|---|---|---|---|---|
| 2019/0229867 A1* | 7/2019 | Yi | .................... | H04L 5/0048 |
| 2019/0260530 A1* | 8/2019 | Yi | .................... | H04W 72/0453 |
| 2019/0373667 A1* | 12/2019 | Jeon | .................... | H04L 5/0044 |
| 2020/0187093 A1* | 6/2020 | Awad | .................... | H04W 72/005 |
| 2020/0252934 A1* | 8/2020 | Xue | .................... | H04L 5/0001 |

FOREIGN PATENT DOCUMENTS

| | | | |
|---|---|---|---|
| CN | 104092636 | A | 10/2014 |
| CN | 104871581 | A | 8/2015 |
| CN | 105635018 | A | 6/2016 |
| CN | 106559206 | A | 4/2017 |
| CN | 106961315 | A | 7/2017 |
| CN | 106961734 | A | 7/2017 |
| EP | 3 539 232 | A1 | 9/2019 |
| RU | 2604812 | C2 | 12/2016 |
| WO | WO-2016/099196 | A1 | 6/2016 |
| WO | WO-2017/039372 | A1 | 3/2017 |
| WO | WO-2017/075829 | A1 | 5/2017 |
| WO | WO-2017/121237 | A1 | 7/2017 |
| WO | WO-2017/132840 | A1 | 8/2017 |
| WO | WO-2017/136068 | A1 | 8/2017 |
| WO | WO-2018/128427 | A1 | 7/2018 |

OTHER PUBLICATIONS

Ericsson: "NB-IoT Channel Raster" 3GPP TSG-RAN1 NB-IOT Ad Hoc; R1-160082; Jan. 20, 2016; Budapest, Hungary (3 pages).
Third Office Action for CN Appl. No. 201710687231.8, dated Jun. 28, 2021 (with English translation, 43 pages).
Extended European Search Reporton EP 18843089.6 dated Mar. 16, 2021 (11 pages).
Huawei et al, "Configuration of control resource set", 3GPP Draft R1-1709951, 3GPP TSG RAN WG1 NR Ad Hoc Meeting, Qingdao, China, Jun. 27-30, 2017 (5 pages).
Huawei et al, "NR-PBCH contents and payload size", 3GPP Draft R1-1709914, 3GPP TSG RAN WG1 NR Ad Hoc Meeting, Qingdao, China, Jun. 27-30, 2017 (7 pages).
Huawei et al, "On initial access for wideband carrier", 3GPP Draft R1-1709973, 3GPP TSG RAN WG1 NR Ad Hoc Meeting, Qingdao, China, Jun. 27-30, 2017 (5 pages).
Qualcomm Incorporated, "Common control resource set signaling in MIB" 3GPP Draft R1-1711186, 3GPP TSG RAN WG1 NR Ad Hoc Meeting, Qingdao, China, Jun. 27-30, 2017 (6 pages).
Second Office Action for CN Appl. No. CN 201710687231.8 dated Mar. 18, 2021 (With English Translation, 11 pages).
First Office Action for RU Appl. No. 2020110051, dated Nov. 23, 2020. (with English translation, 14 pages).
First Office Action for CN Appl. No. CN 201710687231.8 dated Dec. 15, 2020 (With English Translation, 14 pages).
Intel Corporation: "Remaining system information delivery mechanisms" 3GPP TSG RAN WG1 Meeting RAN1 #89; R1-1707340; May 18, 2017; Hangzhou, P.R. China (4 pages).
Qualcomm Incorporated: "Common Control Resource Set and UE-Specific Control Resource Set", 3GPP TSG-RAN WG1 NR AdHoc R1-1700816, Oct. 1, 2017, Spokane, USA. (3 pages).
International Search Report and Written Opinion of the International Searching Authority on PCT/CN2018/098377, dated Oct. 18, 2018 (8 pages).
Qualcomm Incorporated, "Common control resource set and UE-specific control resource set", 3GPP TSG-RAN WG1 NR AdHoc, R1-1700816, Jan. 16-20, 2017 (3 pages).

* cited by examiner

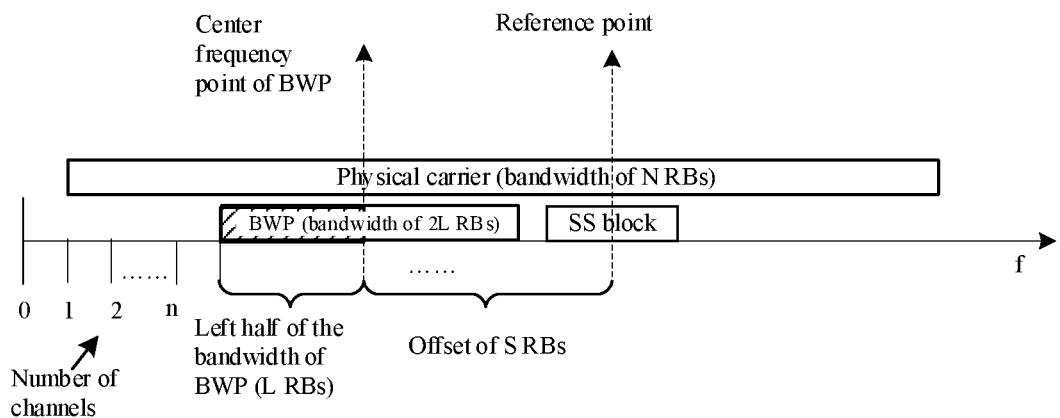

FIG. 11

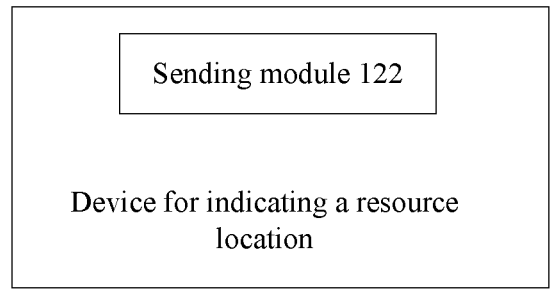

FIG. 12

| A second-type node receives resource location information sent by a first-type node for indicating a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET | S1302 |
|---|---|

FIG. 13

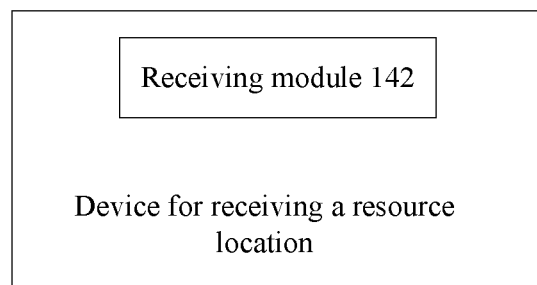

FIG. 14

METHOD, DEVICE, APPARATUS, AND STORAGE MEDIUM FOR INDICATING AND RECEIVING RESOURCE LOCATION

CROSS-REFERENCES TO RELATED APPLICATIONS

This application claims the benefit of priority under 35 U.S.C. § 120 as a continuation of PCT Patent Application No. PCT/CN2018/098377, filed on Aug. 2, 2018, which claims priority to Chinese patent application No. 201710687231.8, filed on Aug. 11, 2017, the disclosure of each of which is incorporated herein by reference in its entirety.

TECHNICAL FIELD

The present solution relates to communications and, in particular, to a method, device, apparatus, and storage medium for indicating and receiving a resource location.

BACKGROUND

In future wireless communication systems (e.g., the 5th generation mobile communication technology (5G)), a carrier frequency higher than that used in the 4G communication system will be used for communications, such as 28 GHz and 45 GHz, and a potential operating band of the 5G new Radio Access Technology (RAT) system will reach 100 GHz. Since the carrier frequency of the high frequency communications has a shorter wavelength, more antenna elements can be accommodated in per unit area. The more antenna elements mean that a beamforming method may be adopted to improve antenna gains, thereby ensuring coverage performance of the high frequency communications.

With the beamforming method, a transmitter may concentrate transmission energy in a certain direction, and the transmission energy in other directions is little or none, that is, each beam has its own directivity and can only cover terminals in a certain direction. The transmitter, i.e., a base station, needs beam scanning in dozens or even hundreds directions to implement a full coverage. In the existing art, the preliminary measurement and identification of beam directions are usually performed during the initial access procedure of the terminal to the network, and each transmit beam on the base station side is polled in a time interval, such that the terminal may measure and identify a preferred beam or port. Specifically, multiple synchronization signal (SS) blocks exist in one synchronization signal transmission period, each SS block bears synchronization signals of a specific beam/port (group), and one beam scanning is completed in one synchronization signal transmission period, that is, transmission of all beams/ports is completed.

In the existing art, a center frequency point (i.e., a direct current component) of a physical carrier is located in a frequency-domain location corresponding to each channel number. A frequency interval between adjacent channel numbers is referred to as a channel raster interval or a carrier raster interval. A step size in frequency domain for the terminal to search for the synchronization signal (SS) is referred to as a frequency raster interval or a UE raster interval. In a Long Term Evolution (LTE) system, the UE raster interval is the same as the channel raster interval, that is, the terminal searches for the SS in every possible frequency-domain location corresponding to the channel numbers. As shown in FIG. 1, FIG. 1 is a schematic diagram of a UE raster being the same as a channel raster in the existing art.

In the NR, in order to deploy the spectrum more flexibly and reduce the complexity of the terminal search in frequency domain, the industry proposes to use a larger UE raster interval, that is, the UE raster interval may be larger than the channel raster interval. In this case, the center frequency point of the SS, the broadcast channel or other related signals/channels may be different from the center frequency point of the physical carrier. The minimum carrier bandwidth and the synchronization bandwidth have been determined in current standard discussion, which means that the maximum value of the UE raster interval has been determined and the minimum value of the UE raster interval is greater than or equal to the channel raster interval. If the UE raster interval takes a certain value between the minimum value and the maximum value, since the NR system bandwidth is usually large, one physical carrier bandwidth may contain multiple SS blocks in the frequency domain.

In addition, the operating bandwidth of the high frequency communications is usually high, up to several hundred MHz. In order to reduce resource scheduling overhead and enable a terminal with a small bandwidth capability to normally communicate, in the related art, the physical carrier bandwidth of an NR system may be divided into multiple bandwidth parts (BWPs), and resources for data transmission may be scheduled for the terminal in the BWP, or broadcast information may be transmitted to the terminal. In the NR, common control information is transmitted in common control resource set(s) (CORESET(s)) and is important information. For example, paging, some UE specific control information and some broadcast information are related to the common control information, and spectrum resources scheduled by the common CORESET(s) need to be within a certain BWP or physical downlink shared channel (PDSCH) resource. How the base station indicates the resource locations of the BWP, PDSCH and common CORESET(s) is thus critical.

SUMMARY

In view of the above, embodiments of the present solution intend to provide a method, device, apparatus, and storage medium for indicating and receiving a resource location, so as to effectively indicate resource locations of the BWP, PDSCH and common CORESET(s).

The embodiments of the present solution provide a method for indicating a resource location. The method includes the following step.

A first-type node sends resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

In an embodiment, the frequency-domain location of the first resource is a frequency-domain location of a SS block, and the frequency-domain location of the second resource is a frequency-domain location of the common CORESET.

In an embodiment, the common CORESET is included in the BWP or the resource occupied by the PDSCH; the common CORESET partially overlaps with the BWP or the resource occupied by the PDSCH; the common CORESET does not overlap with the BWP or the resource occupied by the PDSCH; or the common CORESET has no fixed relationship with the BWP or the resource occupied by the PDSCH.

In an embodiment, a resource scheduled by control information transmitted in the common CORESET is located in the BWP or the resource occupied by the PDSCH.

In an embodiment, the step that the first-type node indicates the frequency-domain location of the first resource to the second-type node includes: indicating a frequency domain offset from the first resource to a reference point, or indicating a frequency domain offset from the first resource to a reference point and a bandwidth of the first resource; where the reference point includes a center or a boundary of any one of: a physical carrier, a downlink SS bandwidth, or a downlink SS block.

In an embodiment, the step that the first-type node indicates the frequency-domain location of the second resource to the second-type node includes: indicating a frequency domain offset from the second resource to a reference point or the first resource, or indicating a frequency domain offset from the second resource to a reference point or the first resource and a bandwidth of the second resource or a relationship between the bandwidth of the second resource and a bandwidth of the first resource; where the reference point includes a center or a boundary of any one of: a physical carrier, a downlink SS bandwidth, or a downlink SS block.

In an embodiment, indicating a frequency-domain of the BWP includes indicating an index of the BWP.

In an embodiment, the frequency-domain location of the first resource is determined to be the frequency-domain location of the SS block in a following manner: the first-type node configures one or more SS blocks in a system bandwidth, where a frequency-domain location of each SS block corresponds to an index; and the frequency-domain location of the first resource is configured as one of frequency-domain locations of the one or more SS blocks.

In an embodiment, indicating the frequency-domain location of the SS block includes: indicating a frequency-domain location index of the SS block.

In an embodiment, the step that the first-type node indicates the frequency-domain location of the resource to the second-type node includes one of: transmitting, by the first-type node, the resource location information on a physical broadcast channel (PBCH); transmitting, by the first-type node, the resource location information on radio resource control (RRC) dedicated signaling; transmitting, by the first-type node, frequency-domain location information of the first resource on a PBCH, and transmitting frequency-domain location information of the second resource on RRC dedicated signaling; or transmitting frequency-domain location information of the first resource and/or part of frequency-domain location information of the second resource on a PBCH, and transmitting remaining part of the frequency-domain location information of the second resource on RRC signaling.

In an embodiment, the RRC dedicated signaling is sent by a node adjacent to the first-type node to the second-type node.

In an embodiment, the offset in the frequency domain includes at least one of: an offset, or an offset direction (left or right) indication.

In an embodiment, the offset in the frequency domain is represented by one or more of: number of channels, number of channel groups, number of physical resource blocks (PRBs), number of PRB groups, or number of sub-carriers.

In an embodiment, the frequency-domain location of the resource is one of: a center location of a resource in a frequency domain; a boundary location of a resource in a frequency domain; a center location and a bandwidth of a resource in a frequency domain; a boundary location of a bandwidth of a resource in a frequency domain; or a bandwidth of a resource.

The embodiments of the present solution further provide a method for receiving a resource location. The method includes the following step: a second-type node receives resource location information sent by a first-type node for indicating a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

In an embodiment, the frequency-domain location of the first resource is a frequency-domain location of a SS block, and the frequency-domain location of the second resource is a frequency-domain location of the common CORESET.

In an embodiment, the method further includes the following step: the second-type node receives the frequency-domain location of the first resource indicated by the first-type node, and determines the frequency-domain location of the second resource according to a pre-defined rule.

In an embodiment, the pre-defined rule is a pre-defined relationship between one or more factors and a frequency-domain offset, where the factors include at least one of: an SS block index, a physical cell identifier (ID), a system frame number (SFN), or band information.

The embodiments of the present solution further provide a device for receiving a resource location. The device is applied to a first-type node and includes a sending module. The sending module is configured to send resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

In an embodiment, the frequency-domain location of the first resource is a frequency-domain location of a SS block, and the frequency-domain location of the second resource is a frequency-domain location of the common CORESET.

The embodiments of the present solution further provide a device for receiving a resource location. The device is applied to a second-type node and includes a receiving module. The receiving module is configured to receive resource location information sent by a first-type node for indicating a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

In an embodiment, the frequency-domain location of the first resource is a frequency-domain location of a SS block, and the frequency-domain location of the second resource is a frequency-domain location of the common CORESET.

The embodiments of the present solution further provide a storage medium. The storage medium includes stored programs, where the programs, when executed, perform the method for indicating a resource location according to the embodiments of the present solution.

The embodiments of the present solution further provide a storage medium. The storage medium includes stored programs, where the programs, when executed, perform the method for receiving a resource location according to the embodiments of the present solution.

The embodiments of the present solution further provide a processor. The processor is configured to execute programs, where when executed, the programs perform the method for indicating a resource location according to the embodiments of the present solution.

The embodiments of the present solution further provide a processor. The processor is configured to execute programs, where when executed, the programs perform the method for receiving a resource location according to the embodiments of the present solution.

The embodiments of the present solution further provide a base station. The base station includes a processor and a memory.

The memory stores processor-executable instructions which, when executed by the processor, perform the following operation: sending resource location information to a second-type node, where the resource location information at least indicates a frequency-domain location of a resource.

The frequency-domain location includes at least one of: a frequency-domain location of a first resource or a frequency-domain location of a second resource, and the first resource or the second resource includes at least one of: a BWP, a resource occupied by a PDSCH, or a common CORESET.

The embodiments of the present solution further provide a terminal. The terminal includes a processor and a memory.

The memory stores processor-executable instructions which, when executed by the processor, perform the following operation: receiving resource location information sent by a first-type node for indicating a frequency-domain location of a resource.

The frequency-domain location includes at least one of: a frequency-domain location of a first resource or a frequency-domain location of a second resource, and the first resource or the second resource includes at least one of: a BWP, a resource occupied by a PDSCH, or a common CORESET.

In the method, device, apparatus (a terminal, a base station or a processor) and storage medium for indicting and receiving a resource location provided by the embodiments of the present solution, a first-type node sends resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET. In other words, the first-type node sends the resource location information to the second-type node to indicate a frequency-domain location of a resource, such that the base station effectively indicates resource locations of the BWP, PDSCH and common CORESET(s).

BRIEF DESCRIPTION OF DRAWINGS

FIG. 2 is a flowchart of a method for indicating a resource location according to an embodiment of the present solution;

FIG. 11 is a schematic diagram (5) of a method for indicating a resource location according to an embodiment of the present solution;

FIG. 12 is a block diagram of a device for indicating a resource location according to an embodiment of the present solution;

FIG. 13 is a flowchart of a method for receiving a resource location according to an embodiment of the present solution;

FIG. 14 is a structural diagram of a device for receiving a resource location according to an embodiment of the present solution;

DETAILED DESCRIPTION

Figure 1:
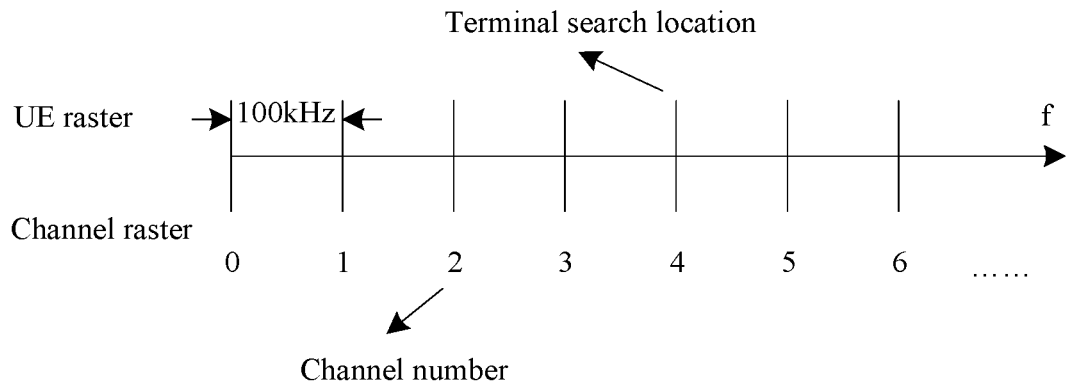
FIG. 1 is a schematic diagram of a UE raster being the same as a channel raster in the related art.

The present solution will be described hereinafter in detail with reference to the drawings and in conjunction with embodiments. It is to be noted that if not in collision, the embodiments and features therein in the present application can be combined with each other.

It is to be noted that the terms "first", "second" and the like in the description, claims and drawings of the present solution are used to distinguish between similar objects and are not necessarily used to describe a particular order or sequence.

This embodiment provides a method for indicating a resource location. FIG. 2 is a flowchart of a method for indicating a resource location according to an embodiment of the present solution. As shown in FIG. 2, the method includes the step described below.

In step S202, a first-type node sends resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

In an embodiment, the first-type node in the above step as an execution body may be a base station, such as a transmit-receive point (TRP), a relay node, a macro base station, a micro base station, a pico base station, a home base station, a remote radio unit (RRU), an access point (AP), and the second-type node, for example, may be a terminal, a relay node or the like. In the following embodiments, the first-type node is for example a base station, and the second-type node is for example a terminal, but the present solution is not limited thereto.

Through the above step S202, the base station can effectively indicate resource locations of the BWP, PDSCH and common CORESET(s).

In an embodiment, the frequency-domain location of the first resource is a frequency-domain location of a SS block, and the frequency-domain location of the second resource is a frequency-domain location of the common CORESET.

In an embodiment, the common CORESET is included in the BWP or the resource occupied by the PDSCH; the common CORESET partially overlaps with the BWP or the resource occupied by the PDSCH; the common CORESET does not overlap with the BWP or the resource occupied by the PDSCH; or the common CORESET has no fixed relationship with the BWP or the resource occupied by the PDSCH.

In an embodiment, a resource scheduled by control information transmitted in the common CORESET is located in the BWP or the resource occupied by the PDSCH.

In an implementation mode of an embodiment, the first-type node indicates the frequency-domain location of the first resource to the second-type node in a following manner: indicating a frequency domain offset from the first resource to a reference point; or indicating a frequency domain offset from the first resource to a reference point and a bandwidth of the first resource.

It is to be noted that the above reference point includes a center or a boundary of any one of: a physical carrier, a downlink SS bandwidth, or a downlink SS block.

In an embodiment, the first-type node indicates the frequency-domain location of the first resource to the second-type node in a following manner: indicating a frequency domain offset from the second resource to a reference point or the first resource; or indicating a frequency domain offset from the second resource to a reference point or the first resource, and a bandwidth of the second resource or a relationship between the bandwidth of the second resource and a bandwidth of the first resource.

It is to be noted that the above reference point includes a center or a boundary of any one of: a physical carrier, a downlink SS bandwidth, or a downlink SS block.

In an embodiment, indicating a frequency-domain of the BWP includes indicating an index of the BWP.

In an embodiment, the frequency-domain location of the first resource is determined to be the frequency-domain location of the configured SS block in a following manner: the first-type node configures one or more SS blocks in a system bandwidth, where a frequency-domain location of each SS block corresponds to an index; and the frequency-domain location of the first resource is configured as one of frequency-domain locations of the one or more SS blocks.

In an embodiment, indicating the frequency-domain location of the configured SS block includes: indicating a frequency-domain location index of the configured SS block.

In an embodiment, the step that the first-type node indicates the frequency-domain location of the resource to the second-type node includes one of: transmitting, by the first-type node, the resource location information on a PBCH; transmitting, by the first-type node, the resource location information on RRC dedicated signaling; transmitting, by the first-type node, frequency-domain location information of the first resource on a PBCH, and transmitting frequency-domain location information of the second resource on RRC dedicated signaling; or transmitting frequency-domain location information of the first resource and/or part of frequency-domain location information of the second resource on a PBCH, and transmitting remaining part of the frequency-domain location information of the second resource on RRC signaling.

In an embodiment, the above RRC dedicated signaling is sent by a node adjacent to the first-type node to the second-type node.

In an embodiment, the above offset in the frequency domain includes at least one of: an offset, or an offset direction (left or right) indication.

In an embodiment, the above offset in the frequency domain is represented by one or more of: number of channels, number of channel groups, number of physical resource blocks (PRBs), number of PRB groups, or number of sub-carriers.

In an embodiment, the frequency-domain location of the resource is a center location of a resource in a frequency domain, the frequency-domain location of the resource is a boundary location of a resource in a frequency domain, the frequency-domain location of the resource is a center location of a resource in a frequency domain and a bandwidth of a frequency-domain resource, the frequency-domain location of the resource is a boundary location of a resource in a frequency domain and a bandwidth of a frequency-domain resource, or the frequency-domain location of the resource is a bandwidth of a frequency-domain resource.

This embodiment shall be illustratively described below in conjunction with specific examples.

It is to be noted that in optional embodiments described below, for the relative channel/channel group/PRB/PRB group/sub-carrier number, a relative channel/channel group/PRB/PRB group/sub-carrier number of A with respect to B generally refers to a difference in number of channel rasters/channel raster groups/PRBs/PRB groups/sub-carriers between a frequency-domain location where A is located and a frequency-domain location where B is located.

For the offset direction of A with respect to B in the frequency domain, the offset direction is the right when the frequency-domain location where A is located is higher than the frequency-domain location where B is located, and the offset direction is the left when the frequency-domain location where A is located is lower than the frequency-domain location where B is located.

Optional Embodiment One

In the description of this optional embodiment, the frequency-domain locations of the first and the second resources are indicated using an offset in the frequency domain with respect to a reference point.

Figure 3:
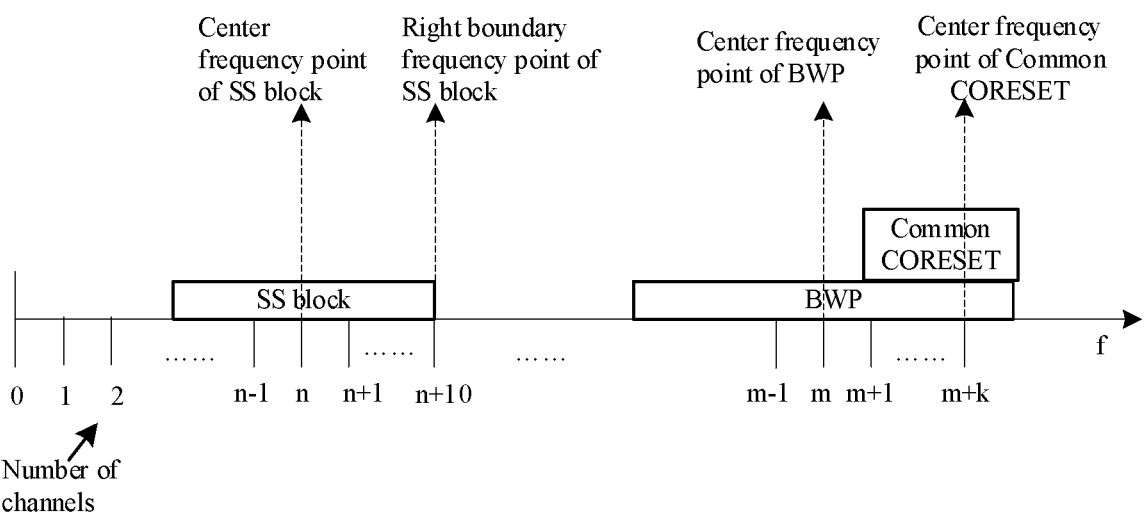
FIG. 3 is a schematic diagram of frequency-domain locations of an SS block, a BWP and a common CORESET in an NR carrier according to an embodiment of the present solution.

FIG. 3 shows frequency-domain locations of the SS block, BWP and common CORESET in the NR carrier, where n is a channel number corresponding to a center frequency point of the SS block, m is a channel number corresponding to a center frequency point of the BWP, and m+k is a channel number corresponding to a center frequency point of the common CORESET.

In an embodiment, the base station may schedule the BWP or schedule part of BWP resources by a physical downlink control channel (PDCCH) transmitted in the common CORESET, the first resource is for example the BWP, the second resource is for example the common CORESET, and the reference point is for example a center of the SS block. In this embodiment, the base station indicates offsets of the center frequency points of the BWP and the common COREET with respect to the center frequency point of the SS block as well as bandwidths of the BWP and the common COREET to the terminal. The specific indication content includes number of channels, an offset direction (left or right) indication and a bandwidth, as shown in Table 1. The number of channels is a difference in number of channel rasters between a frequency-domain location where the center frequency point of the BWP or common CORESET is located and a frequency-domain location where the center frequency point of the SS block is located. The offset (left or right) direction indication indicates whether the offset direction of the center frequency point of the BWP or common CORESET with respect to the center frequency point of the SS block is the right or the left, where the offset direction is the right when the center frequency point of the BWP or common CORESET is higher than the center frequency point of the SS block, and the offset direction is the left when the center frequency point of the BWP or common CORESET is lower than the center frequency point of the SS block.

TABLE 1

| | Number of channels | Offset direction indication (0 means the offset to the left, and 1 means the offset to the right) | Bandwidth (represented by the number of resource blocks(RBs)) |
| --- | --- | --- | --- |
| BWP | m − n | 1 | 50 |
| Common CORESET | m + k − n | 1 | 20 |

In an embodiment, the base station may indicate information, such as offsets and offset direction (left or right) indications of the center frequency points of the BWP and common CORESET with respect to the center frequency point of the SS block and bandwidths of the BWP and common CORESET, to the terminal by using a physical broadcast channel or RRC dedicated signaling, or the base station indicates part of the above information to the terminal by using the physical broadcast channel, and indicates the remaining part of the above information to the terminal by using the RRC dedicated signaling.

In an embodiment, the RRC dedicated signaling may also be sent to the terminal by an adjacent base station.

Using the number of channels to denote the offset of the center frequency point of the BWP or common CORESET with respect to the center frequency point of the SS block is merely an example. If a frequency difference between the center frequency point of the BWP or common CORESET and the center frequency point of the SS block is not an integer multiple of channel rasters, the offset of the center frequency point of the BWP or common CORESET with respect to the center frequency point of the SS block cannot be accurately represented only by the number of channels, and in this case, other methods are required.

The offset of the center frequency point of the BWP or common COREET with respect to the center frequency point of the SS block may also be represented by a relative sub-carrier number of the center frequency point of the BWP or common COREET with respect to the center frequency point of the SS block, where the relative sub-carrier number is a difference in number of sub-carriers between the frequency-domain location where the center frequency point of the BWP or common CORESET is located and the frequency-domain location where the center frequency point of the SS block is located. The offset direction is the right when the center frequency point of the BWP or common CORESET is higher than the center frequency point of the SS block, and the offset direction is the left when the center frequency point of the BWP or common CORESET is lower than the center frequency point of the SS block. If a frequency of the center frequency point of the BWP is higher than a frequency of the center frequency point of the SS block (sub-carriers are numbered in an ascending order from low to high frequency) and a difference between the center frequency point of the BWP and the center frequency point of the SS block is K sub-carriers, the offset of the center frequency point of the BWP with respect to the center frequency point of the SS block is the relative sub-carrier number, K, and the offset direction is the right.

In another example, the offset of the center frequency point of the BWP or common COREET with respect to the center frequency point of the SS block may also be represented by a relative PRB number of the center frequency point of the BWP or common CORESET with respect to the center frequency point of the SS block.

In another example, the offset of the center frequency point of the BWP or common COREET with respect to the center frequency point of the SS block may also be represented by a relative PRB number of the center frequency point of the BWP or common CORESET with respect to the center frequency point of the SS block, and a relative sub-carrier number of the center frequency point of the BWP or common COREET with respect to a frequency-domain location corresponding to the relative PRB number.

In another example, the offset of the center frequency point of the BWP or common COREET with respect to the center frequency point of the SS block may also be represented by number of channel of the center frequency point of the BWP or common CORESET with respect to the center frequency point of the SS block, and a relative sub-carrier number of the center frequency point of the BWP or common COREET with respect to a frequency-domain location corresponding to the number of channel.

In another example, the offset of the center frequency point of the BWP or common COREET with respect to the center frequency point of the SS block may also be represented by the number of channel of the center frequency point of the BWP or common CORESET with respect to the center frequency point of the SS block, and a relative PRB number of the center frequency point of the BWP or common COREET with respect to the frequency-domain location corresponding to the number of channel.

In another example, the offset of the center frequency point of the BWP or common COREET with respect to the center frequency point of the SS block may also be represented by number of channel of the center frequency point of the BWP or common CORESET with respect to the center frequency point of the SS block, a relative PRB number of the center frequency point of the BWP or common COREET with respect to the frequency-domain location corresponding to the number of channel, and a relative sub-carrier number of the center frequency point of the BWP or common COREET with respect to the frequency-domain location corresponding to the relative PRB number The bandwidths of the first and the second resources are not limited to the indication method in Table 1. N1 bandwidths may also be pre-defined, and the bandwidth of a certain resource may be represented by only log 2(N1)-bit information. For example, four bandwidths are pre-defined: 100 RBs, 50 RBs, 30 RBs, and 20 RBs, the bandwidth of a certain resource may be represented by only 2-bit information.

If the bandwidth of the BWP is fixed, for example, 50 RBs, the base station does not need to indicate the bandwidth of the BWP to the terminal. Similarly, if the bandwidth of the common CORESET is fixed, for example, 20 RBs, the base station does not need to indicate the bandwidth of the common CORESET to the terminal. In other words, the base station only needs to indicate the offset of the center frequency point of the BWP or common CORESET with respect to the center frequency point of the SS block to the terminal.

In addition, if the offset of the center frequency point of the BWP or common CORESET with respect to the center frequency point of the SS block is fixed, for example, if both the offset and the offset direction (right or left) are fixed, the base station only needs to indicate the size of the bandwidth to the terminal, and if only the offset is fixed, the base station only needs to indicate the offset direction as well as the size of the bandwidth.

In addition, a location of the BWP or common COREET may also be indicated by an offset of a boundary (e.g., a left boundary, i.e., a starting frequency-domain location, or a right boundary, i.e., an ending frequency-domain location) of the BWP or common COREET with respect to the center frequency point of the SS block. The location of the BWP or common COREET may be represented by the number of RBs offset from the reference point. For example, zero RB offset from the reference point means that the location coincides with the center frequency point of the SS block, and the indication method is similar to the indication method using the offset of the center frequency point of the BWP or common CORESET with respect to the center frequency point of the SS block.

In an embodiment, the offset of the center or the boundary (e.g., the left boundary, i.e., the starting frequency-domain location, or the right boundary, i.e., the ending frequency-domain location) of the BWP or common CORESET with respect to the center frequency point of the SS block and the bandwidth of the BWP or common CORESET may be indicated using 1-bit offset direction (left or right) indication and a resource indication value (RIV).

The bandwidth of the RB may be determined according to a sub-carrier interval adopted by the SS block, or may be determined according to a sub-carrier interval notified by the PBCH or a remaining minimum system information (RMSI) or the RRC dedicated signaling. One RB contains 12 sub-carriers in the frequency domain.

In addition, it is to be noted that the indication method of the base station to the terminal in following two cases is similar to the method described in above embodiments: (1) the first resource is a resource occupied by the PDSCH, and the second resource is the common CORESET; and (2) the first resource is the common CORESET, and the second resource is the BWP or a resource occupied by the PDSCH.

In the above embodiments, the reference point is described by taking the center frequency point of the SS block as an example, and when the reference point is a center or boundary of the NR carrier, a center or boundary of the downlink SS bandwidth or a boundary of the SS block, a similar method may be adopted to indicate the offset of the center frequency point of the BWP or common CORESET with respect to the reference point. For example, when the reference point is a right boundary of the SS block, Table 2 shows the bandwidth and offset of the center frequency point of the BWP or common CORESET with respect to a right boundary frequency point of the SS block.

TABLE 2

|  | Number of channel | Offset direction indication (0 means the offset to the left, and 1 means the offset to the right) | Bandwidth (represented by the number of RBs) |
| --- | --- | --- | --- |
| BWP | m − n − 10 | 1 | 50 |
| Common CORESET | m + k − n − 10 | 1 | 20 |

In summary, when the location of the BWP or common CORESET is one of the center frequency point or boundary and the reference point is any one of the center or boundary of the NR carrier, the center or boundary of the downlink SS bandwidth or the center or boundary of the SS block, a method similar to the method in the above embodiments may be adopted to indicate the frequency-domain location of the BWP or common CORESET.

Optional Embodiment Two

In the description of this optional embodiment, the frequency-domain location of the first resource is indicated using an offset in the frequency domain with respect to the reference point, and the frequency-domain location of the second resource is indicated using an offset in the frequency domain with respect to the first resource.

Figure 4:
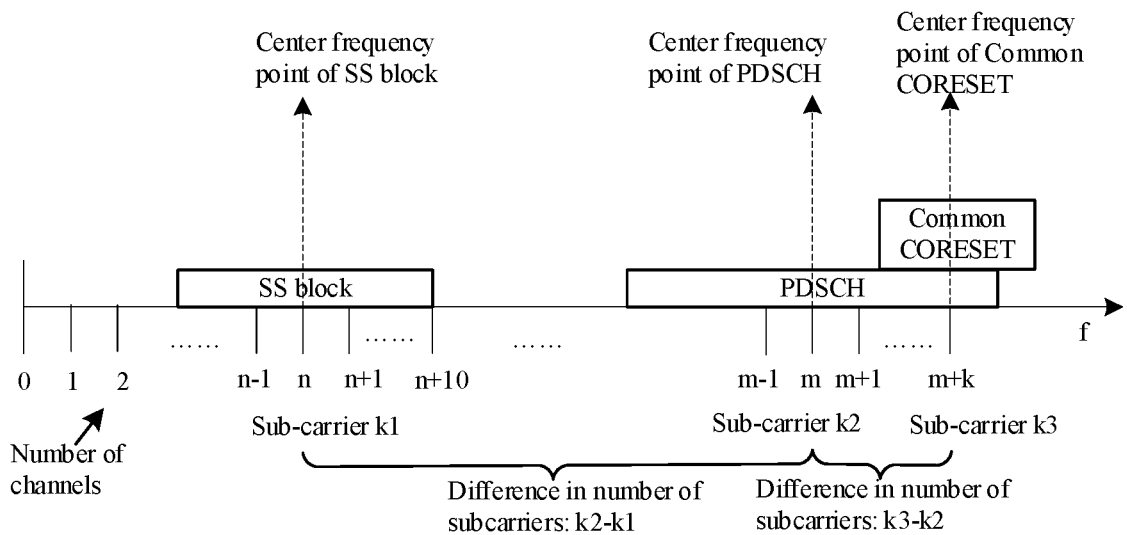
FIG. 4 is a schematic diagram (1) of frequency-domain locations of an SS block, a BWP and a common CORESET in an NR carrier according to an embodiment of the present solution.

FIG. 4 shows frequency-domain locations of the SS block, PDSCH and common CORESET in the NR carrier, where k1, k2 and k3 are sub-carrier numbers corresponding to center frequency points of the SS block, PDSCH and common CORESET respectively, and the base station may schedule resources occupied by the PDSCH by the PDCCH transmitted in the common CORESET. The first resource is for example the resource occupied by the PDSCH, the second resource is for example the common CORESET, and the reference point is for example the center of the SS block. In this embodiment, the base station indicates to the terminal an offset of a center frequency point of the PDSCH with respect to the center frequency point of the SS block, a bandwidth of the PDSCH, an offset of the center frequency point of the common CORESET with respect to the center frequency point of the PDSCH and the bandwidth of the common CORESET, and the specific indication content includes the relative sub-carrier number, the offset direction (left or right) indication and the bandwidth as shown in Table 3.

The relative sub-carrier number of the center frequency point of the PDSCH with respect to the center frequency point of the SS block refers to a difference in number of sub-carriers between a frequency-domain location where the center frequency point of the PDSCH is located and the frequency-domain location where the center frequency point of the SS block is located. The offset direction is the right when the center frequency point of the PDSCH is higher than the center frequency point of the SS block, and the offset direction is the left when the center frequency point of the PDSCH is lower than the center frequency point of the SS block.

The relative sub-carrier number of the center frequency point of the common CORESET with respect to the center frequency point of the PDSCH refers to a difference in number of sub-carriers between the frequency-domain location where the center frequency point of the common CORESET is located and the frequency-domain location where the center frequency point of the PDSCH is located. The offset direction is the right when the center frequency point of the common CORESET is higher than the center frequency point of the PDSCH, and the offset direction is the left when the center frequency point of the common CORESET is lower than the center frequency point of the PDSCH.

TABLE 3

|  | Relative sub-carrier number | Offset direction indication (0 means the offset to the left, and 1 means the offset to the right) | Bandwidth (represented by the number of RBs) |
| --- | --- | --- | --- |
| PDSCH | k2-k1 | 1 | 50 |
| Common CORESET | k3-k2 | 1 | 20 |

In a case that the first resource is the common CORESET and the second resource is the resource occupied by the PDSCH, a similar method may be adopted for indicating. Specifically, the base station indicates to the terminal the offset of the center frequency point of the common CORESET with respect to the center frequency point of the SS block, the bandwidth of the common CORESET, the offset of the center frequency point of the PDSCH with respect to the center frequency point of the common CORESET and the bandwidth of the PDSCH, and the specific indication content includes the relative sub-carrier number, the offset direction (left or right) indication and the bandwidth as shown in Table 4. It is to be noted that since the center frequency point of the PDSCH is lower than the center frequency point of the common CORESET, when the offset of the center frequency point of the PDSCH with respect to the center frequency point of the common CORESET is indicated, the offset direction indication is 0, that is, the offset direction of the center frequency point of the PDSCH with respect to the center frequency point of the common CORESET is the left.

TABLE 4

|  | Relative sub-carrier number | Offset direction indication (0 means the offset to the left, and 1 means the offset to the right) | Bandwidth (represented by the number of RBs) |
| --- | --- | --- | --- |
| Common CORESET | k3-k1 | 1 | 50 |
| PDSCH | k3-k2 | 0 | 20 |

If the bandwidth of the PDSCH is fixed, for example, 50 RBs, the base station does not need to indicate the bandwidth of the PDSCH to the terminal. Similarly, if the bandwidth of the common CORESET is fixed, for example, 20 RBs, the base station does not need to indicate the bandwidth of the common CORESET to the terminal.

The base station may notify the terminal of frequency-domain locations of the PDSCH and common CORESET using the PBCH or RRC dedicated signaling, or notify the frequency-domain location of the resource occupied by the PDSCH using the PBCH and notify the frequency-domain location of the common CORESET using the RRC dedicated signaling, or notify the frequency-domain location of the common CORESET using the PBCH and notify the frequency-domain location of the dedicated resource of the PDSCH using the RRC dedicated signaling. The RRC dedicated signaling may also be sent to the terminal by an adjacent base station.

Optional Embodiment Three

In the description of this optional embodiment, the frequency-domain location of the first resource is indicated using an offset in the frequency domain with respect to the reference point, and the second-type node calculates the frequency-domain location of the second resource according to a pre-defined rule.

Figure 5:
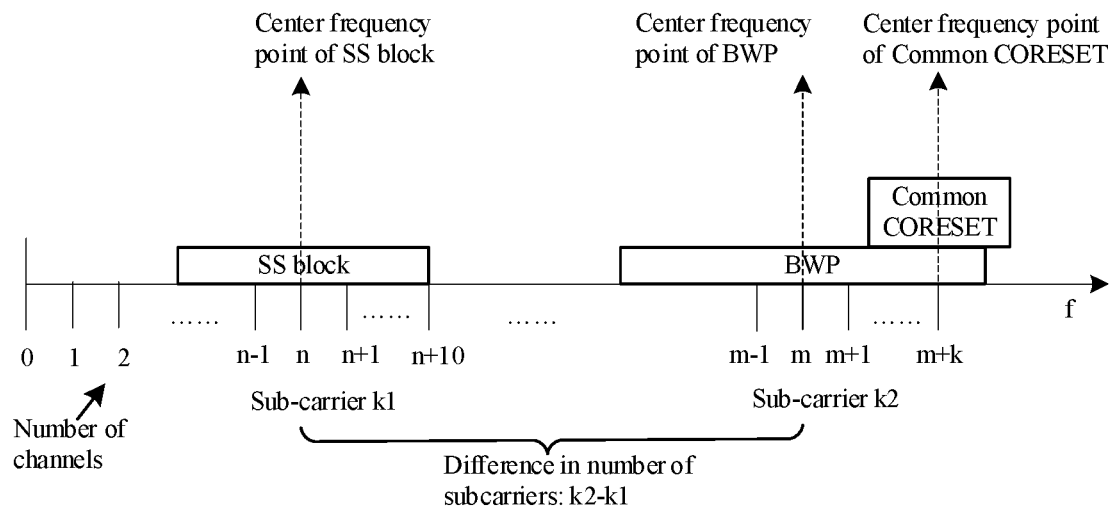
FIG. 5 is a schematic diagram (2) of frequency-domain locations of an SS block, a BWP and a common CORESET in an NR carrier according to an embodiment of the present solution.

FIG. 5 shows frequency-domain locations of the SS block, BWP and common CORESET in the NR carrier. The first resource is for example the BWP, the second resource is for example the common CORESET, and the reference point is for example the center of the SS block. In this embodiment, the base station indicates to the terminal the offset of the center frequency point of the BWP with respect to the center frequency point of the SS block, the bandwidth of the BWP and the bandwidth of the common CORESET, and the specific indication content includes the relative sub-carrier number, the offset direction (left or right) indication and the bandwidth as shown in Table 5, where "-" means that the term does not exist.

The relative sub-carrier number of the center frequency point of the BWP with respect to the center frequency point of the SS block refers to a difference in number of sub-carriers between the frequency-domain location where the center frequency point of the BWP is located and the frequency-domain location where the center frequency point of the SS block is located. The offset direction is the right when the center frequency point of the BWP is higher than the center frequency point of the SS block, and the offset direction is the left when the center frequency point of the BWP is lower than the center frequency point of the SS block.

The terminal calculates the offset of the center frequency point of the common CORESET with respect to the center frequency point of the BWP according to a pre-defined rule.

The pre-defined rule defines a relationship between one or more factors and the offset of the center frequency point of the common CORESET with respect to the reference point or the center frequency point of the BWP, and the factors include at least one of: an SS block index, a physical cell identifier, a system frame number, or band information.

The pre-defined rule may be a default frequency domain offset, for example, an offset of 4 RBs; or may be pre-defined according to one or more of: timing information, a physical cell ID, or band information, specifically for example, an SS block index, a physical cell ID, an SFN, a band range, etc. The SS block index is an index of an SS block where the SS is located when the terminal completes downlink synchronization, and the SNF is a number of a radio frame where the SS is located when the terminal completes downlink synchronization. The band range is divided in advance, and each band range corresponds to a unique band range identifier. The principle for determining the pre-defined rule is that offsets of the center frequency point of the common CORESET with respect to the center frequency point of the BWP calculated according to different SS block indexes (groups), physical cell IDs (groups), SFNs (groups) and band ranges (groups) should be as different as possible, so as to reduce mutual interference between adjacent cells when information is transmitted using the common CORESET.

For example, the pre-defined rule may be that the SS block index N2 corresponds to that the center frequency point of the common CORESET is offset by N2 RBs with respect to the center frequency point of the BWP.

In another example, the pre-defined rule may be that the SS block index N2 corresponds to that the center frequency point of the common CORESET is offset by K*floor(N2/M) RBs with respect to the center frequency point of the BWP, where floor denotes rounding down.

In another example, the pre-defined rule may be that the SS block index N2 corresponds to that the center frequency point of the common CORESET is offset by K*mod(N2, M) RBs with respect to the center frequency point of the BWP, where mod is a modulo operation.

In another example, the pre-defined rule may also be determined according to the physical cell ID, the SFN or the band range.

For example, the pre-defined rule is an offset of K*floor (X/M) RBs or K*mod(X, M) RBs, where X may be the cell ID, the SFN or the band range identifier.

The pre-defined rule may also be a combination of the above methods, for example, an offset of K*floor(N2/M)+ L*mod(cell ID, M) RBs.

In the above formula, N2 and X are nonnegative integers, K and L are positive integers, and M is an integer greater than 1.

For example, using the index of the SS block where the SS is located being 2 when the terminal succeeds in the downlink synchronization as an example, when the SS block index N2 corresponds to that the center frequency point of the common CORESET is offset by N2 RBs with respect to the center frequency point of the BWP according to the pre-defined rule, the center frequency point of the common CORESET is offset by 2 RBs with respect to the center frequency point of the BWP, and then the frequency-domain location of the common CORESET may be known according to the offset direction (left or right) indication being 1 and the bandwidth of the common CORESET being 20 RBs.

The above offset in the unit of RBs is merely an example, and the offset actually is not limited to the RBs, but may be in any unit which can measure the frequency, for example, Y kHz/MHz, RB groups, sub-carriers, sub-carrier groups, channel rasters, channel raster groups, etc.

In addition, the method for indicating a resource by the base station to the terminal is similar to the method described in the above embodiments in the following cases: (1) the first resource is the common CORESET, and the second resource is the BWP; (2) the first resource is the common CORESET, and the second resource is the resource occupied by the PDSCH; and 3) the first resource is the resource occupied by the PDSCH, and the second resource is the common CORESET. The main idea is that the first resource is an offset in the frequency domain with respect to the reference point indication, and the second resource is an offset in the frequency domain with respect to the first resource and calculated by the terminal according to the pre-defined rule.

TABLE 5

| | Relative sub-carrier number | Offset direction indication (0 means the offset to the left, and 1 means the offset to the right) | Bandwidth (represented by the number of RBs) |
|---|---|---|---|
| BWP | k2-k1 | 1 | 50 |
| Common CORESET | — | 1 | 20 |

Optional Embodiment Four

In the description of this optional embodiment, the frequency-domain of the BWP is indicated by indicating the index of the BWP.

Figure 6:
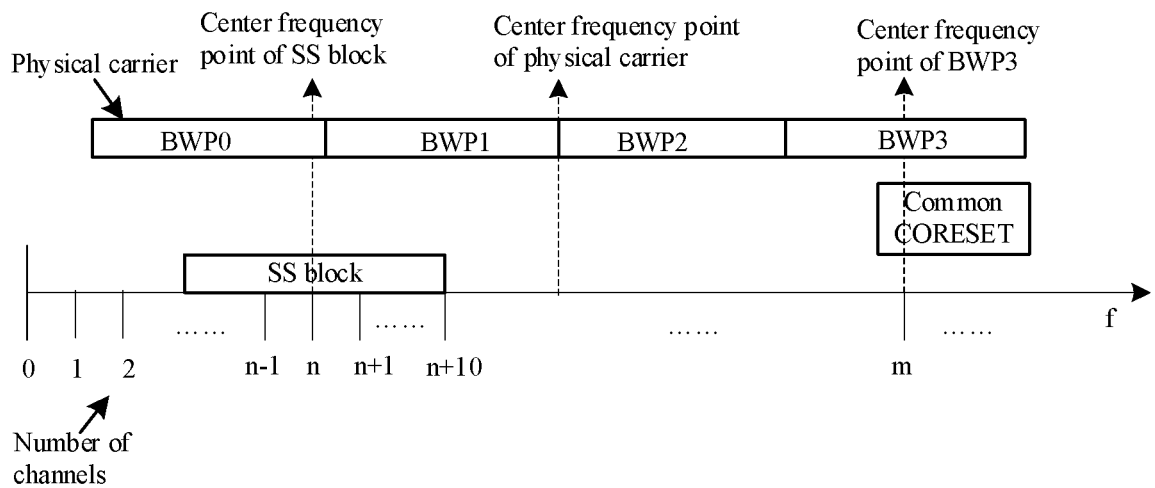
FIG. 6 is a schematic diagram of a method for indicating a resource location according to an embodiment of the present solution.

The base station evenly divides the system bandwidth (i.e., the bandwidth of the physical carrier) into several BWPs, and as shown in FIG. 6, the base station divides the physical bandwidth into 4 BWPs, and indexes of these BWPS are 0, 1, 2 and 3 respectively. Assuming that the terminal has already known the center frequency point of the physical carrier and the division manner of BWPs in the system bandwidth, the base station may directly indicate an index of the BWP to the terminal using 2-bit information. For example, the base station directly indicates to the terminal that the index of the BWP is 3, and the terminal may acquire the frequency-domain location of the BWP3 according to a center frequency and bandwidth of the physical carrier as well as the division manner of BWPs, and may know that resources scheduled by control information transmitted in the common CORESET are located in the BWP3. Compared to the manner of indicating a bandwidth and offset of the BWP3 with respect to the reference point, the above manner has an advantage of greatly reducing overhead for indicating the frequency-domain location of the BWP3.

In addition, the base station may indicate frequency-domain location of the common CORESTE through the method described in the above embodiments, and details will not be described herein.

The base station may indicate the BWP index and the frequency-domain location of the common CORESET to the terminal using the RRC dedicated signaling, or notify the BWP index using the PBCH and notify the frequency-domain location of the common CORESET using the RRC dedicated signaling, or notify the frequency-domain location of the common CORESET using the PBCH and notify the BWP index using the RRC dedicated signaling.

Optional Embodiment Five

In the description of this optional embodiment, the frequency-domain location of the resource is indicated by indicating a frequency-domain location index of a configured SS block and indicating the offset of the common CORESET with respect to the frequency-domain location of the configured SS block.

Figure 7:
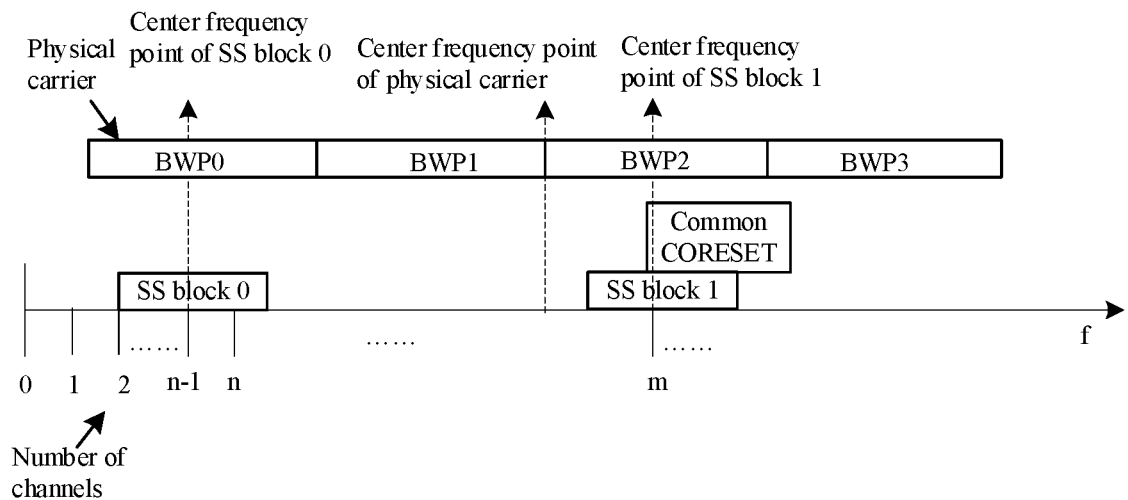
FIG. 7 is a schematic diagram (1) of a method for indicating a resource location according to an embodiment of the present solution.

The base station configures one or more SS blocks in the system bandwidth, a frequency-domain location of each SS block corresponds to an index. As shown in FIG. 7, the base station configures two SS blocks in the system bandwidth, and indexes of the SS blocks are 0 and 1 respectively. Assuming that the terminal knows the frequency-domain location of each SS block and BWPs where the two SS blocks are located respectively as well as bandwidths of the BWPs, the base station directly indicates the frequency-domain location indexes of the configured SS blocks to the terminal using 1-bit information, and the terminal may acquire frequency-domain locations of the configured SS blocks according to configuration information of the SS blocks and may know that resource scheduled by control information transmitted in the common CORESET are located in the BWP2. Compared to the manner of indicating a bandwidth and offset of the BWP2 with respect to the reference point, the above manner has an advantage of greatly reducing overhead for indicating the frequency-domain location of the BWP2.

The base station then indicates offsets of the center frequency point or boundary of the common CORESET with respect to center frequency points or boundaries of the configured SS blocks as well as the bandwidth of the common CORESET to the terminal, so as to enable the terminal to acquire a frequency-domain location of a common CORESET resource. The terminal may successfully acquire information carried on the common CORESET according to the BWP (i.e., BWP2) where resources scheduled by the common CORESET are located and a time-domain location of the common CORESET resource acquired by using other methods.

Optional Embodiment Six

This optional embodiment describes a method for jointly indicating bandwidths of the common CORESET, BWP and PDSCH using a relationship between a bandwidth of a common CORESET resource and the BWP or a bandwidth of a resource of the PDSCH.

If the relationship between the bandwidth of the first resource and the bandwidth of the second resource is fixed, the bandwidths of the first and the second resources may be jointly indicated. Assuming that there are multiple fixed relationships between the bandwidth of the first resource and the bandwidth of the second resource, the bandwidth of one of the resources as well as a relationship between the bandwidths of the two resources may be indicated.

For example, if the first resource is the BWP and the second resource is the common CORESET, there are two relationships between the bandwidth of the first resource and the bandwidth of the second resource: (1) the bandwidth of the second resource is the same as the bandwidth of the first resource; and (2) the bandwidth of the second resource is half of the bandwidth of the first resource. The base station only needs to indicate the bandwidth of the first resource as well as the relationship (i.e., one of the two relationships described above) between the bandwidth of the first resource and the bandwidth of the second resource, and does not need to indicate the bandwidths of the two resources respectively, thereby reducing resource overhead for indicating especially when the bandwidths are relatively larger.

Optional Embodiment Seventh

Using the indication of the frequency-domain location of the BWP as an example, this optional embodiment describes a specific implementation method for indicating the frequency-domain location of the resource.

The offset of the boundary or center of the BWP with respect to the reference point and the bandwidth of the BWP may be indicated using a 1-bit offset direction (left or right) indication and the RIV, which includes the following cases.

(1) The bandwidth of the BWP is fixed, that is, the base station and the terminal know the bandwidth of the BWP in advance, the number of bits occupied by the RIV is determined by a maximum offset of a left boundary or right boundary or center of the BWP with respect to the reference point, that is, the number of bits occupied by the RIV is determined by the number of bits required for representing the maximum offset, and the value of the RIV is equal to an offset of the left boundary or right boundary or center of the BWP with respect to the reference point. For example, the maximum offset is 31 RBs, the offset of the center of the BWP with respect to the reference point is 12 RBs, and since at least 5-bit information is required for representing the maximum offset, the number of bits occupied by the RIV is 5, RIV is equal to 12 and is represented in the binary number as 01100.

Figure 8:
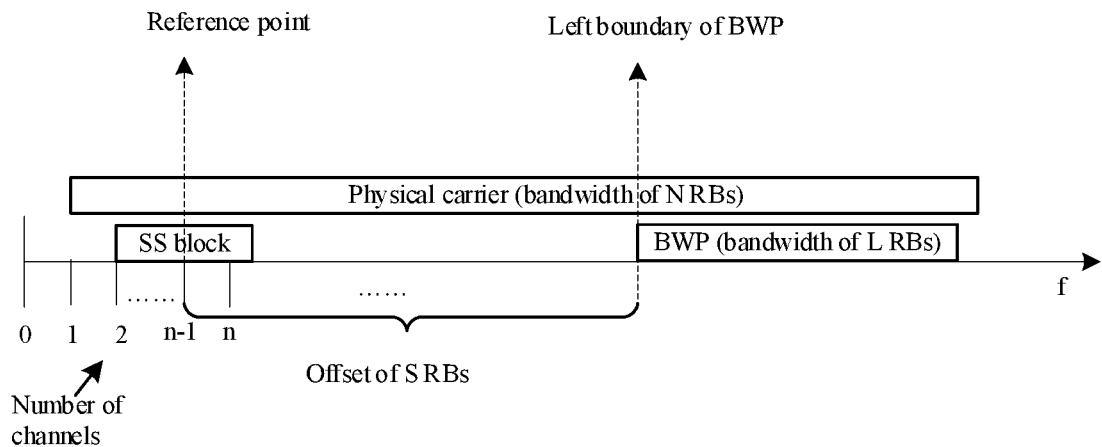
FIG. 8 is a schematic diagram (2) of a method for indicating a resource location according to an embodiment of the present solution.
Figure 9:
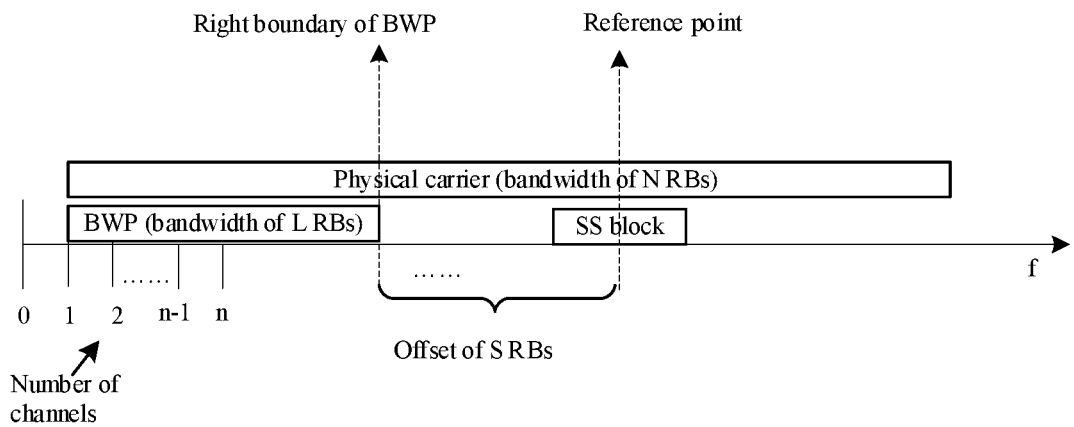
FIG. 9 is a schematic diagram (3) of a method for indicating a resource location according to an embodiment of the present solution.

(2) The bandwidth of the BWP is not fixed, the reference point is outside the BWP, and then the indication method is as follows: the left boundary and bandwidth of the BWP are indicated when the BWP is located on the right of the reference point while the right boundary and bandwidth of the BWP are indicated when the BWP is located on the left of the reference point. Specifically, a maximum offset of the boundary of the BWP with respect to the reference point is the bandwidth of the physical carrier or a fixed value, the base station determines the RIV value according to an offset of the boundary of the BWP with respect to the reference point and the bandwidth of the BWP and sends the RIV value to the terminal, and the terminal then calculates the offset of the boundary of the BWP with respect to the reference point and the bandwidth of the BWP according to the received RIV value and acquires a boundary location and bandwidth of the BWP according to the acquired offset direction (left or right) indication. It is assumed that the maximum offset is the bandwidth of the physical carrier and is represented by N RBs. L denotes that the bandwidth of the BWP is L RBs, S denotes that the offset of the boundary of the BWP with respect to the reference point is S RBs, and the left boundary of the BWP is located on the right of the reference point, as shown in FIG. 8; and the right boundary of the BWP is located on the left of the reference point, as shown in FIG. 9. The number of bits occupied by the RIV is $$\left\lceil \log_2 \frac{N(N+1)}{2} \right\rceil,$$

the value of the RIV is as follows:

$$\text{if } L-1 \leq \left\lfloor \frac{N}{2} \right\rfloor, RIV = N(L-1)+S \quad \text{(Formula 1)}$$

$$\text{otherwise, } RIV = N(N-L+1)+N-1-S \quad \text{(Formula 2)}$$

The terminal, after receiving the RIV, calculates the value of $$\left\lfloor \frac{RIV}{N} \right\rfloor + RIV \% N$$

first.

For Formula 1, $$\left\lfloor \frac{RIV}{N} \right\rfloor + RIV \% N = L+S-1.$$

For Formula 2, $$\left\lfloor \frac{RIV}{N} \right\rfloor + RIV \% N = 2N-(L+S).$$

% denotes a remainder operation. Since L+S≤N (otherwise the BWP can exceed the range of the bandwidth of the physical carrier), for Formula 1, $$\left\lfloor \frac{RIV}{N} \right\rfloor + RIV \% N = L+S-1 < N,$$

and for Formula 2, $$\left\lfloor \frac{RIV}{N} \right\rfloor + RIV \% N \geq N.$$

Therefore, the terminal may know which formula (one of Formula 1 or Formula 2) adopted to calculate the RIV according to a relationship between the value of $$\left\lfloor \frac{RIV}{N} \right\rfloor + RIV \% N$$

and the magnitude of N.

If Formula 1 is adopted, $$L = \left\lfloor \frac{RIV}{N} \right\rfloor + 1, 5 = RIV \% N;$$

and if Formula 2 is adopted, $$L = N+1 - \left\lfloor \frac{RIV}{N} \right\rfloor,$$

and S=1−RIV % N. The terminal acquires values of S and L, that is, the terminal acquires the offset of the boundary of the BWP with respect to the reference point and the bandwidth of the BWP, and with the offset direction (left or right) indication, the terminal determines whether the left boundary or the right boundary, thereby acquiring the frequency-domain location of the BWP, that is, the boundary location and bandwidth of the BWP.

Figure 10:
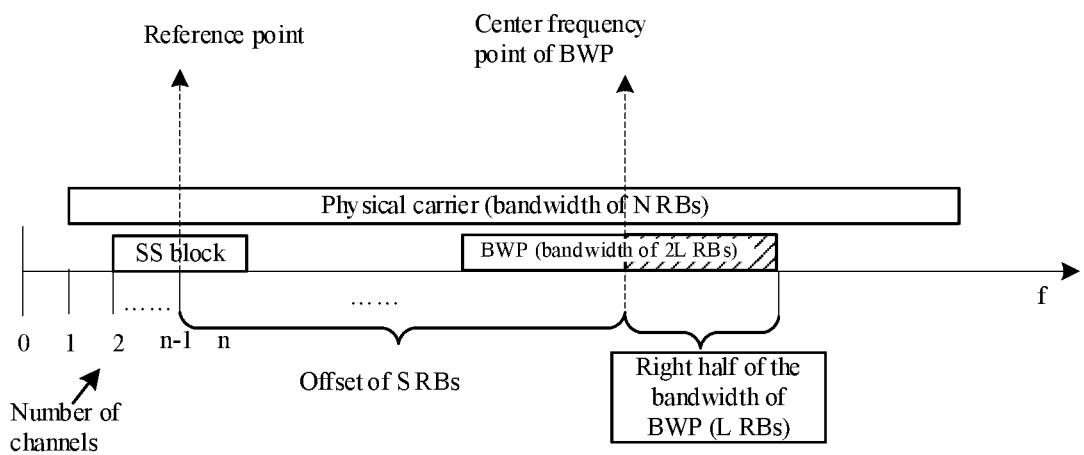
FIG. 10 is a schematic diagram (4) of a method for indicating a resource location according to an embodiment of the present solution.

(3) The bandwidth of the BWP is not fixed, the indication of the center frequency point location and bandwidth of the BWP includes: the offset of the center frequency point of the BWP with respect to the reference point, the offset direction (left or right) indication, and the bandwidth of the BWP. The specific method is as follows: a maximum offset N of the center frequency point of the BWP with respect to the reference point is pre-determined in a protocol, the base station determines the value of the RIV according to the offset of the center frequency point of the BWP with respect to the reference point and the bandwidth of the BWP, the terminal calculates the offset of the center frequency point of the BWP with respect to the reference point and the bandwidth of the BWP according to the received value of the RIV and acquires a center frequency point location and bandwidth of the BWP according to the acquired offset direction (left or right) indication. It is assumed that the maximum offset is the bandwidth of the physical carrier, N denotes that the bandwidth of the physical carrier is N RBs, 2L denotes that the bandwidth of the BWP is 2L RBs (that is, the bandwidth is an even number of RBs), that is, half of the bandwidth of the BWP is L RBs, S denotes that the offset of the center frequency point of the BWP with respect to the reference point is S RBs, and the center frequency point of the BWP is located on the right of the reference point, as shown in FIG. 10; and the center frequency point of the BWP is located on the left of the reference point, as shown in FIG. 11. The number of bits occupied by the RIV is $$\left\lceil \log_2 \frac{N(N+1)}{2} \right\rceil,$$

the value of the RIV is as follows:

$$RIV = N(L-1)+S \quad \text{(Formula 5)}$$

The terminal, after receiving the RIV, calculates values of L and S, that is, $$L = \left\lfloor \frac{RIV}{N} \right\rfloor + 1$$

and S=RIV % n. Therefore, the terminal acquires the bandwidth of the BWP, $$2L = 2\left\lfloor \frac{RIV}{N} \right\rfloor + 2,$$

and the offset, S=RIV % N. The terminal acquires values of S and 2L, that is, the terminal acquires the offset of the center frequency point of the BWP with respect to the reference point and the bandwidth of the BWP, thereby acquiring the frequency-domain location of the BWP.

During the implementation, the corresponding method is selected according to practical conditions.

In all of above embodiments, the base station also needs to indicate the time-domain location of the common CORESET to the terminal, so as to enable the terminal to quickly acquire information transmitted in the common CORESET. The time-domain location of the common CORESET may be indicated in other methods. For example, if the common CORESET is periodically sent, a sending period, a radio frame where a starting location of a period is located, and a starting location of the common CORESET and the number of continuous orthogonal frequency division multiplexing (OFDM) symbols in each sending period may be indicated. If the common CORESET is not sent periodically, a time-domain offset of the common CORESET with respect to a certain reference point (e.g., delay of n OFDM symbols) and the number of continuous OFDM symbols may be indicated.

This embodiment provides a method for indicating a resource location. The method includes the following step: a first-type node indicates a frequency-domain location of a resource to a second-type node, which includes at least one of: indicating a frequency-domain location of the first-type node or indicating a frequency-domain location of the second-type node. The first resource refers to the BWP or the resource occupied by the PDSCH, and the second resource refers to resources of the common CORESET(s). In another example, the first resource refers to resources of the common CORESET(s), and the second resource refers to the BWP or the resource occupied by the PDSCH, so as to enable the base station to indicate resources locations of the BWP, PDSCH and common CORESET(s) to the terminal, solving the problem in the related art that the base station cannot indicate resources locations of the BWP, PDSCH and common CORESET(s). In addition, the frequency-domain location of the second resource is calculated according to the pre-defined rule, reducing the indication overhead and reducing the mutual interference between adjacent cells when information is transmitted using indicated resources to some extent. In addition, the method for jointly indicating the resource bandwidth may also reduce resource indication overhead.

If not in collision, the features of the various embodiments may be combined with each other. Each embodiment is merely the optimal embodiments of the present application.

From the description of the preceding embodiments, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the technical solution of the present solution substantially, or the part contributing to the related art, may be embodied in the form of a software product. The computer software product is stored in a storage medium (such as a random access memory (RAM)/read-only memory (ROM), a magnetic disk or an optical disk) and includes several instructions for enabling a terminal device (which may be a mobile phone, a computer, a server, a network device or the like) to execute the method according to each embodiment of the present solution.

The embodiments of the present solution further provide a device for receiving a resource location. The device is used for implementing the method embodiments described above. What has been described will not be repeated. As used below, the term "module" may be software, hardware or a combination thereof capable of implementing predetermined functions. The apparatus described in the following embodiment is preferably implemented by software, but implementation by hardware or a combination of software and hardware is also possible and conceived.

FIG. 12 is a block diagram of a device for indicating a resource location according to an embodiment of the present solution. The device is applied to a base station, and as shown in FIG. 12, the device includes a sending module 122.

The sending module 122 is configured to send resource location information to a second-type node, where the resource location information at least indicates a frequency-domain location of a resource.

The frequency-domain location includes at least one of: a frequency-domain location of a first resource or a frequency-domain location of a second resource, and the first resource or the second resource includes at least one of: a BWP, a resource occupied by a PDSCH, or a common CORESET.

Through the device shown in FIG. 12, the problem in the related art that the base station cannot indicate resources locations of the BWP, PDSCH and common CORESET(s) is solved, implementing the technical effect of effective indication of resource locations.

In an embodiment, the frequency-domain location of the first resource is a frequency-domain location of a configured SS block, and the frequency-domain location of the second resource is a frequency-domain location of the common CORESET.

In an embodiment, the above frequency-domain location of the first resource is a frequency-domain location of a configured SS block, and the frequency-domain location of the second resource is a frequency-domain location of the common CORESET.

In an embodiment, the above common CORESET is included in the BWP or the resource occupied by the PDSCH; the common CORESET partially overlaps with the BWP or the resource occupied by the PDSCH; the common CORESET does not overlap with the BWP or the resource occupied by the PDSCH; or the common CORESET has no fixed relationship with the BWP or the resource occupied by the PDSCH.

In an embodiment, a resource scheduled by control information transmitted in the above common CORESET is located in the BWP or the resource occupied by the PDSCH.

In an embodiment, the above first-type node indicates the frequency-domain location of the first resource to the second-type node in a following manner:

indicating a frequency domain offset from the first resource to a reference point, or indicating a frequency domain offset from the first resource to a reference point and a bandwidth of the first resource.

It is to be noted that the above reference point includes a center or a boundary of any one of: a physical carrier, a downlink SS bandwidth, or a downlink SS block.

In an embodiment, the above first-type node indicates the frequency-domain location of the first resource to the second-type node in a following manner:

indicating a frequency domain offset from the second resource to a reference point or the first resource or indicating a frequency domain offset from the second resource to a reference point or the first resource, and a bandwidth of the second resource or a relationship between the bandwidth of the second resource and a bandwidth of the first resource.

It is to be noted that the above reference point includes a center or a boundary of any one of: a physical carrier, a downlink SS bandwidth, or a downlink SS block.

In an embodiment, indicating a frequency-domain of the BWP includes indicating an index of the BWP.

In an embodiment, the frequency-domain location of the first resource is determined to be the frequency-domain location of the configured SS block in a following manner: the first-type node configures one or more SS blocks in a system bandwidth, where a frequency-domain location of each SS block corresponds to an index; and the frequency-domain location of the first resource is configured as one of frequency-domain locations of the one or more SS blocks.

In an embodiment, indicating the frequency-domain location of the configured SS block includes: indicating a frequency-domain location index of the configured SS block.

In an embodiment, the step that the first-type node indicates the frequency-domain location of the resource to the second-type node includes one of: transmitting, by the first-type node, the resource location information on a PBCH; transmitting, by the first-type node, the resource location information on RRC dedicated signaling; transmitting, by the first-type node, frequency-domain location information of the first resource on a PBCH, and transmitting frequency-domain location information of the second resource on RRC dedicated signaling; or transmitting frequency-domain location information of the first resource and/or part of frequency-domain location information of the second resource on a PBCH, and transmitting remaining part of the frequency-domain location information of the second resource on RRC signaling.

In an embodiment, the above RRC dedicated signaling is sent by a node adjacent to the first-type node to the second-type node.

In an embodiment, the above offset in the frequency domain includes at least one of: an offset, or an offset direction (left or right) indication.

In an embodiment, the above offset in the frequency domain is represented by one or more of: number of channels, number of channel groups, number of physical resource blocks (PRBs), number of PRB groups, or number of sub-carriers.

In an embodiment, the frequency-domain location of the resource is a center location of a resource in a frequency domain, the frequency-domain location of the resource is a boundary location of a resource in a frequency domain, the frequency-domain location of the resource is a center location of a resource in a frequency domain and a bandwidth of a frequency-domain resource, the frequency-domain location of the resource is a boundary location of a resource in a frequency domain and a bandwidth of a frequency-domain resource, or the frequency-domain location of the resource is a bandwidth of a frequency-domain resource.

It is to be noted that the various modules described above may be implemented by software or hardware. Implementation by hardware may, but may not necessarily, be performed in the following manners: the various modules described above are located in the same processor, or the various modules described above are located in different processors in any combination form.

The embodiments of the present solution further provide a method for receiving a resource location. Corresponding to the solution shown in FIG. 2, FIG. 13 is a flowchart of a method for receiving a resource location according to an embodiment of the present solution. As shown in FIG. 13, the method includes the step described below.

In step S1302, a second-type node receives resource location information sent by a first-type node for indicating a frequency-domain location of a resource; where the frequency-domain location includes at least one of: a frequency-domain location of a first resource or a frequency-domain location of a second resource, and the first resource or the second resource includes at least one of: a BWP, a resource occupied by a PDSCH, or a common CORESET.

In an embodiment, the first-type node in the above step as an execution body may be a base station, specifically such as a TRP, a relay node, a macro base station, a micro base station, a pico base station, a home base station, a remote radio unit (RRU), an AP or the like, and the second-type node, for example, may be a terminal, a relay node. In the following embodiments, the first-type node is for example a base station, and the second-type node for example by a terminal, but the present solution is not limited thereto.

Through the above step S1302, the problem in the related art that the base station cannot indicate resources locations of the BWP, PDSCH and common CORESET(s) is solved, implementing the technical effect of effective indication of resource locations.

In an embodiment, the frequency-domain location of the first resource is a frequency-domain location of a configured SS block, and the frequency-domain location of the second resource is a frequency-domain location of the common CORESET.

In an embodiment, the second-type node may also receive the frequency-domain location of the first resource indicated by the first-type node, and determine the frequency-domain location of the second resource according to a pre-defined rule.

It is to be noted that the pre-defined rule is a pre-defined relationship between one or more factors and a frequency-domain offset, where the factors include at least one of: an SS block index, a physical cell ID, an SFN, or band information.

In an embodiment, the second-type node receives the resource location information, thereby acquiring at least one of the frequency-domain location of the first resource or the frequency-domain location of the second resource.

In an embodiment, the second-type node receives the resource location information, acquires the frequency-domain location of the resource of the common CORESET(s) as well as a frequency-domain location of a resource scheduled by control information of the common CORESET(s), and then acquires control information transmitted in the common CORESET in conjunction with the time-domain location of the resource acquired in the above optional embodiments.

From the description of the preceding embodiments, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present solution substantially, or the part contributing to the existing art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present solution.

The embodiments of the present solution further provide a device for receiving a resource location. The device is used for implementing the above embodiments and preferred embodiments. What has been described will not be repeated. As used below, the term "module" may be software, hardware or a combination thereof capable of implementing predetermined functions. The apparatus described in the following embodiment is preferably implemented by software, but implementation by hardware or a combination of software and hardware is also possible and conceived.

FIG. 14 is a structural diagram of a device for receiving a resource location according to an embodiment of the present solution. The device is applied to a terminal, and as shown in FIG. 14, the device includes a receiving module 142.

The receiving module 142 is configured to receive resource location information sent by a first-type node for indicating a frequency-domain location of a resource.

The frequency-domain location includes at least one of: a frequency-domain location of a first resource or a frequency-domain location of a second resource, and the first resource or the second resource includes at least one of: a BWP, a resource occupied by a PDSCH, or a common CORESET.

Through the device shown in FIG. 14, the problem in the related art that the base station cannot indicate resources locations of the BWP, PDSCH and common CORESET(s) is solved, implementing the technical effect of effective indication of resource locations.

In an embodiment, the frequency-domain location of the first resource is a frequency-domain location of a configured SS block, and the frequency-domain location of the second resource is a frequency-domain location of the common CORESET.

In an embodiment, the second-type node may also receive the frequency-domain location of the first resource indicated by the first-type node, and determine the frequency-domain location of the second resource according to a pre-defined rule.

It is to be noted that the pre-defined rule is a pre-defined relationship between one or more factors and a frequency-domain offset, where the factors include at least one of: an SS block index, a physical cell ID, an SFN, or band information.

It is to be noted that the various modules described above may be implemented by software or hardware. Implementation by hardware may, but may not necessarily, be performed in the following manners: the various modules described above are located in the same processor, or the various modules described above are located in different processors in any combination form.

The embodiments of the present solution further provide a storage medium. The storage medium includes stored programs, where the programs, when executed, perform the method for indicating a resource location according to the embodiments of the present solution.

Correspondingly, the storage medium may further be configured to store program codes for executing the step described below.

In S1, a first-type node sends resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

The embodiments of the present solution further provide a storage medium. The storage medium includes stored programs, where the programs, when executed, perform the method for receiving a resource location according to the embodiments of the present solution.

Correspondingly, the storage medium is further configured to store program codes for executing the step described below.

In S2, a second-type node receives resource location information sent by a first-type node for indicating a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

The storage medium may include, but is not limited to, a USB flash disk, a ROM, a RAM, a mobile hard disk, a magnetic disk, an optical disk or another medium capable of storing the program codes.

The embodiments of the present solution further provide a processor. The processor is configured to execute programs, where when executed, the programs perform the method for indicating a resource location according to the embodiments of the present solution.

Correspondingly, the programs are configured to perform the step described below.

In S1, a first-type node sends resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

The embodiments of the present solution further provide a processor. The processor is configured to execute programs, where when executed, the programs perform the method for receiving a resource location according to the embodiments of the present solution.

Correspondingly, the programs are configured to perform the step described below.

In S2, a second-type node receives resource location information sent by a first-type node for indicating a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

Figure 15:
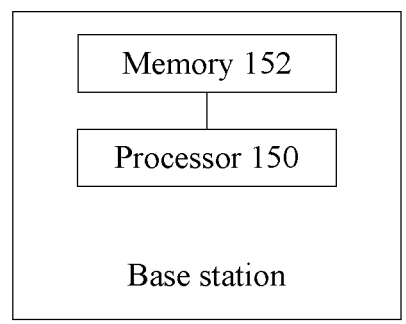
FIG. 15 is a block diagram of a base station according to an embodiment of the present solution.

The embodiments of the present solution further provide a base station. As shown in FIG. 15, the base station includes: a processor 150 and a memory 152 storing processor-executable instructions which, when executed by the processor, perform the following operation: sending resource location information to a second-type node, where the resource location information at least indicates a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

Figure 16:
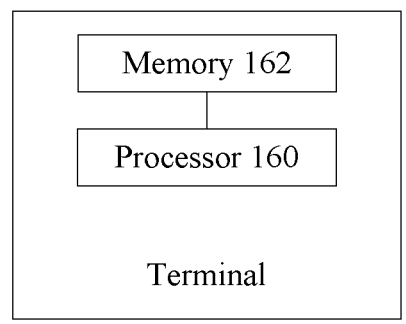
FIG. 16 is a block diagram of a terminal according to an embodiment of the present solution.

The embodiments of the present solution further provide a terminal. As shown in FIG. 16, the terminal includes: a processor 160 and a memory 162 storing processor-executable instructions which, when executed by the processor, perform the following operation: receiving resource location information sent by a first-type node for indicating a frequency-domain location of a resource, where the frequency-domain location includes at least one of: a frequency-domain location of a first resource or a frequency-domain location of a second resource, and the first resource or the second resource includes at least one of: a BWP, a resource occupied by a PDSCH, or a common CORESET.

Apparently, it should be understood by those skilled in the art that each of the above-mentioned modules or steps of the present solution may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present solution is not limited to any specific combination of hardware and software.

The above are only preferred embodiments of the present solution and not intended to limit the present solution, and for those skilled in the art, the present solution may have various modifications and variations. Any modifications, equivalent substitutions, improvements and the like made within the principle of the present solution should fall within the scope of the present solution.

The invention claimed is:

1. A method for indicating a resource location, comprising:
sending, by a base station, resource location information to a terminal on a physical broadcast channel (PBCH), wherein the resource location information at least indicates: a frequency-domain location of a second resource according to a frequency domain offset from the second resource to a boundary location of a first resource in a frequency domain, and a bandwidth of the second resource,
wherein the second resource comprises a common control resource set, the first resource comprises a synchronization signal (SS) block, and a frequency-domain location of the first resource is indicated by the boundary location of the first resource in the frequency domain and a bandwidth of the first resource, and
wherein the frequency domain offset is from a boundary location of the second resource to the boundary location of the first resource in the frequency domain, and the frequency domain offset is represented by a combination of a number of physical resource blocks (PRBs) and a number of sub-carriers.

2. The method of claim 1, wherein the frequency domain offset in the frequency domain comprises an offset value.

3. The method of claim 1, wherein the common control resource set is in a bandwidth part (BWP) or partially overlaps with the BWP.

4. The method of claim 1, wherein the frequency domain offset in the frequency domain comprises an offset direction indication.

5. A method for receiving a resource location, comprising:
receiving, by a terminal on a physical broadcast channel (PBCH), resource location information sent by a base station, wherein the resource location information at least indicates: a frequency-domain location of a second resource according to a frequency domain offset from the second resource to a boundary location of a first resource in a frequency domain, and a bandwidth of the second resource,
wherein the second resource comprises a common control resource set, the first resource comprises a synchronization signal (SS) block, and a frequency-domain location of the first resource is indicated by the boundary location of the first resource in the frequency domain and a bandwidth of the first resource, and
wherein the frequency domain offset is from a boundary location of the second resource to the boundary location of the first resource in the frequency domain, and the frequency domain offset is represented by a combination of a number of physical resource blocks (PRBs) and a number of sub-carriers.

6. The method of claim 5, wherein the frequency domain offset in the frequency domain comprises an offset value.

7. The method of claim 5, wherein the common control resource set is in a bandwidth part (BWP) or partially overlaps with the BWP.

8. The method of claim 5, wherein the frequency domain offset in the frequency domain comprises an offset direction indication.

9. A device for indicating a resource location, comprising:
at least one processor configured to send resource location information to a terminal on a physical broadcast channel (PBCH), wherein the resource location information at least indicates: a frequency-domain location of a second resource according to a frequency domain offset from the second resource to a boundary location of a first resource in a frequency domain, and a bandwidth of the second resource,
wherein the second resource comprises a common control resource set, the first resource comprises a synchronization signal (SS) block, and a frequency-domain location of the first resource is indicated by the boundary location of the first resource in the frequency domain and a bandwidth of the first resource, and
wherein the frequency domain offset is from a boundary location of the second resource to the boundary location of the first resource in the frequency domain, and the frequency domain offset is represented by a combination of a number of physical resource blocks (PRBs) and a number of sub-carriers.

10. The device of claim 9, wherein the frequency domain offset in the frequency domain comprises an offset value.

11. The device of claim 9, wherein the common control resource set is in a bandwidth part (BWP) or partially overlaps with the BWP.

12. The device of claim 9, wherein the frequency domain offset in the frequency domain comprises an offset direction indication.

13. A device for receiving a resource location, comprising:
at least one processor configured to receive resource location information on a physical broadcast channel (PBCH), sent by a base station, wherein the resource location information at least indicates: a frequency-domain location of a second resource according to a frequency domain offset from the second resource to a boundary location of a first resource in a frequency domain, and a bandwidth of the second resource,
wherein the second resource comprises a common control resource set, the first resource comprises a synchronization signal (SS) block, and a frequency-domain location of the first resource is indicated by the boundary location of the first resource in the frequency domain and a bandwidth of the first resource, and
wherein the frequency domain offset is from a boundary location of the second resource to the boundary location of the first resource in the frequency domain, and the frequency domain offset is represented by a combination of a number of physical resource blocks (PRBs) and a number of sub-carriers.

14. The device of claim 13, wherein the frequency domain offset in the frequency domain comprises an offset value.

15. The device of claim 13, wherein the common control resource set is in a bandwidth part (BWP) or partially overlaps with the BWP.

16. The device of claim 13, wherein the frequency domain offset in the frequency domain comprises an offset direction indication.

* * * * *